UNITED STATES PATENT OFFICE

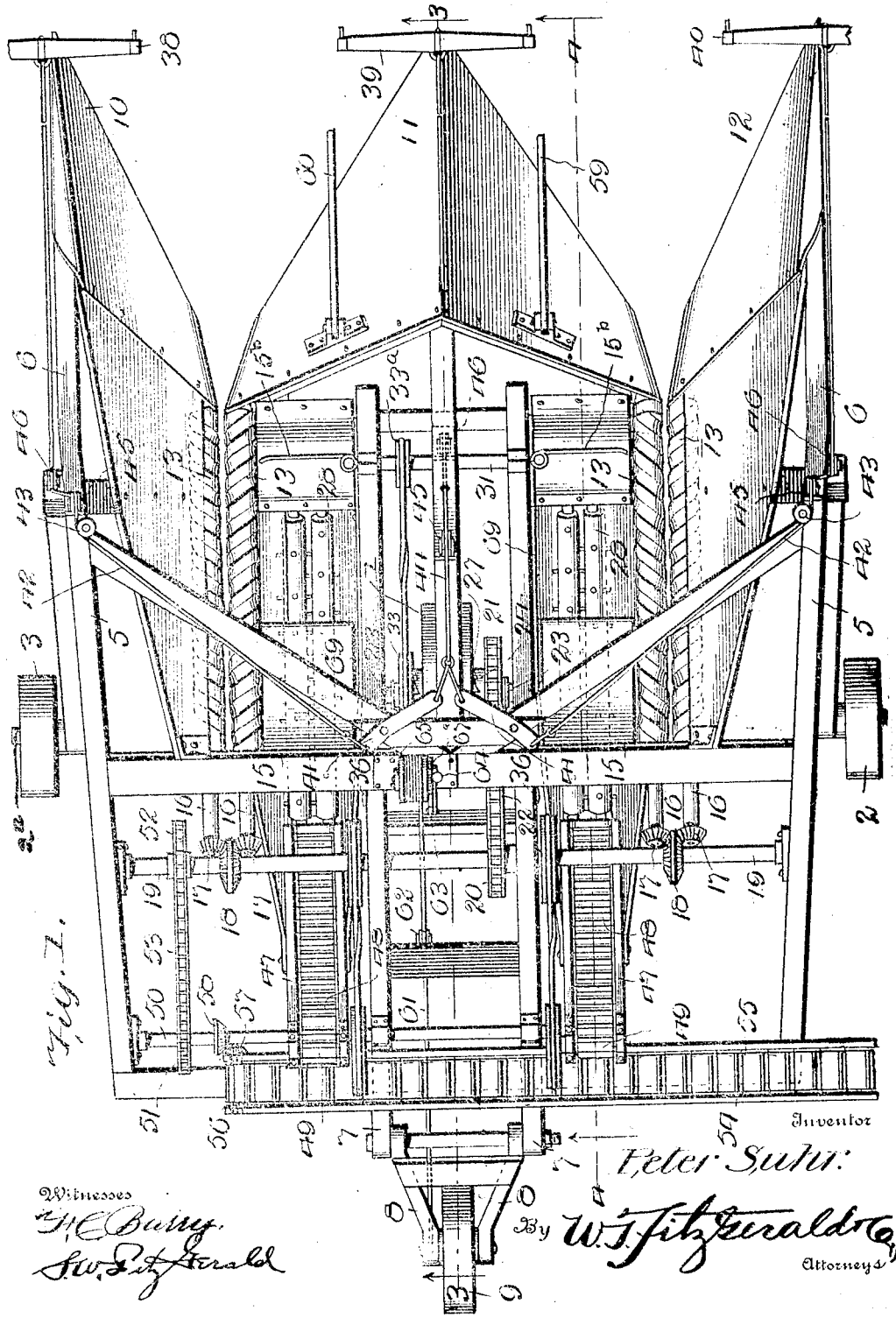

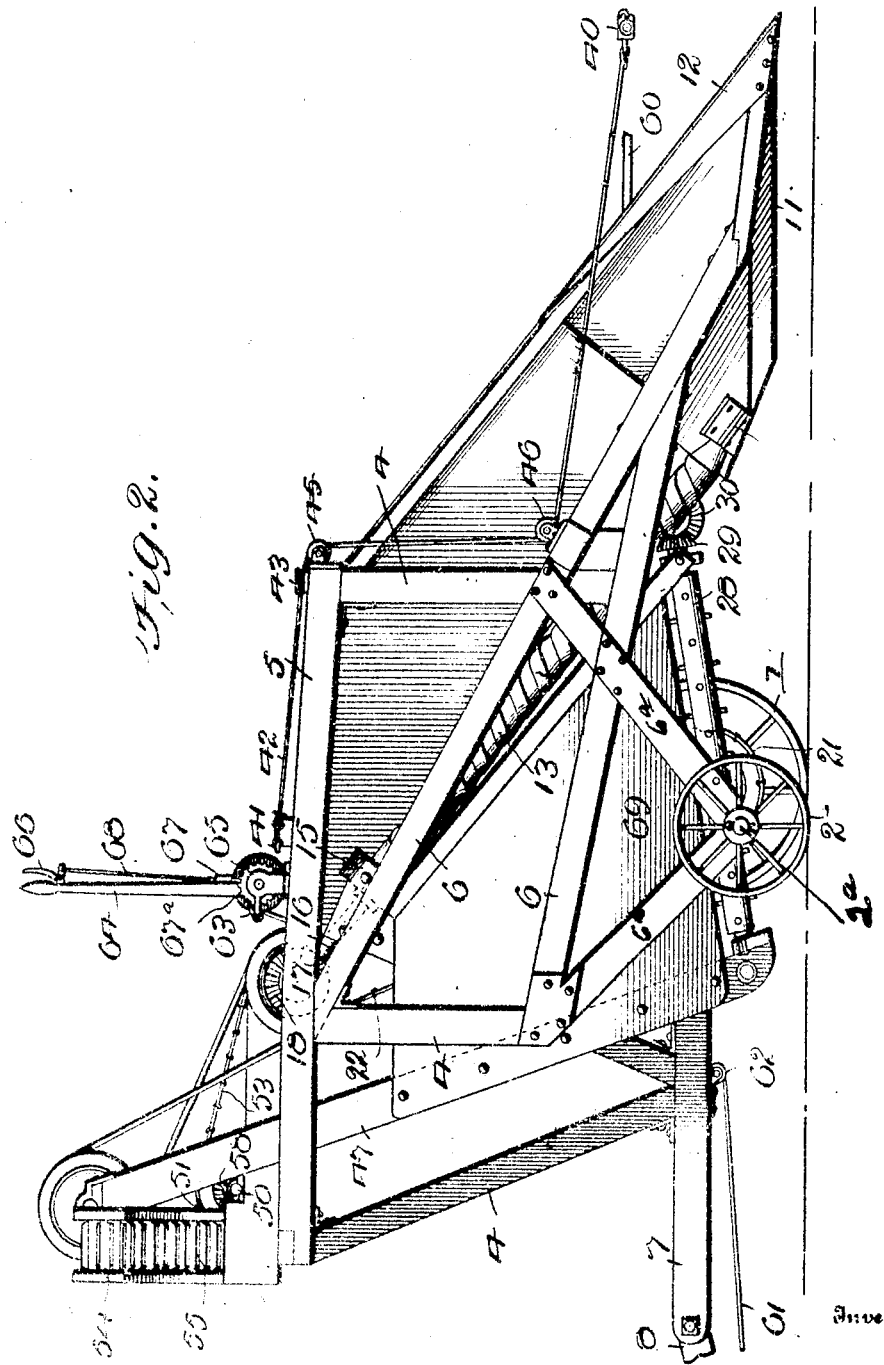

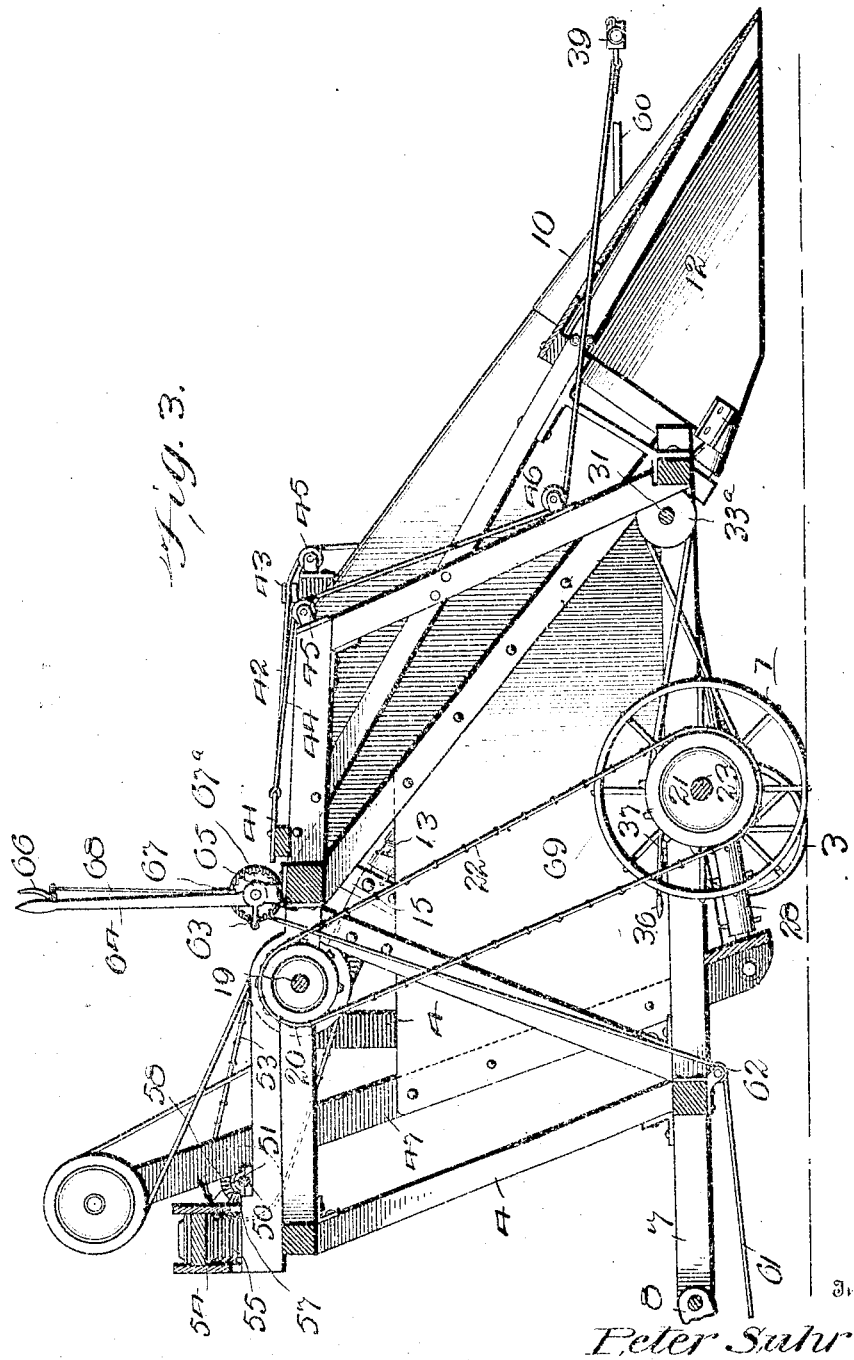

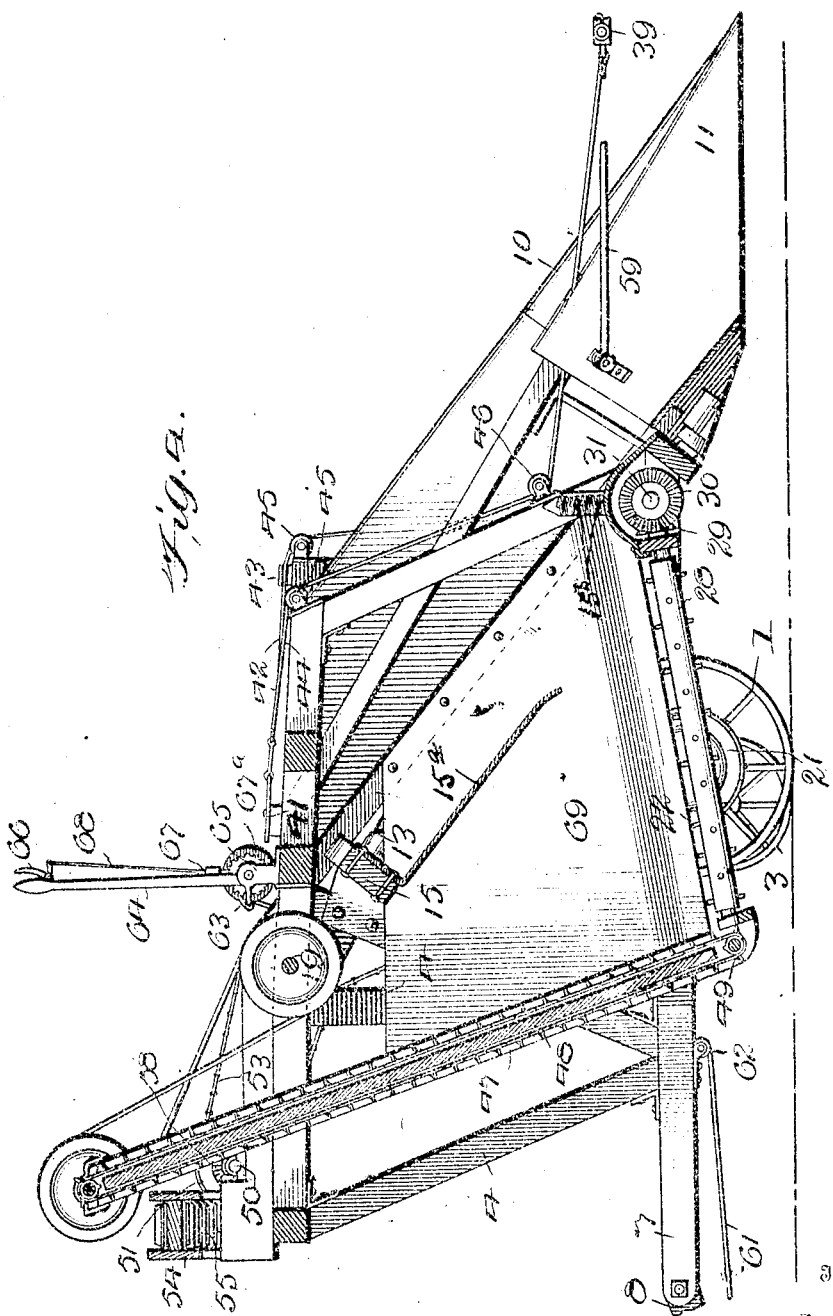

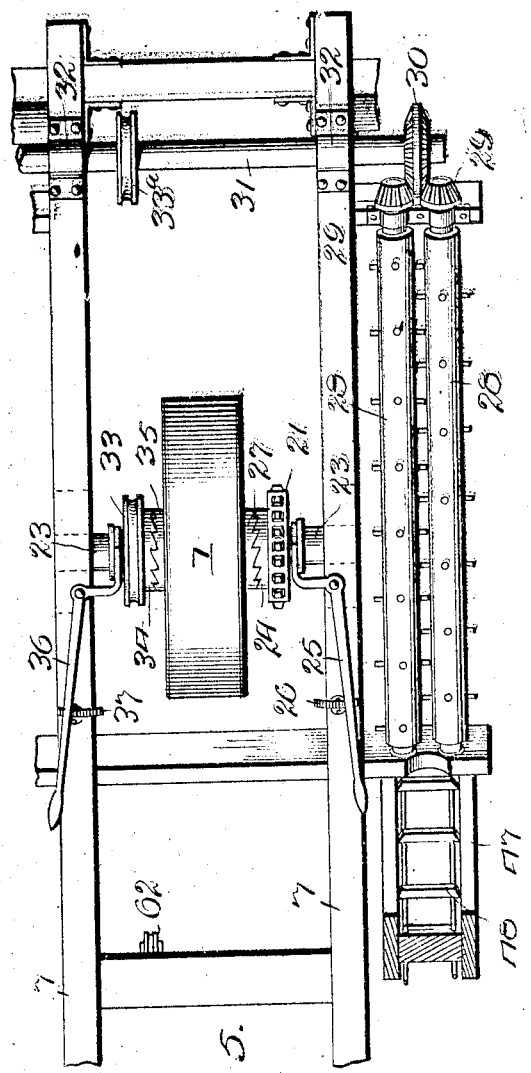

PETER SUHR, OF SCHLESWIG, IOWA, ASSIGNOR OF ONE-HALF TO WILLIAM SCHMIDT, OF SCHLESWIG, IOWA.

CORN-HARVESTING MACHINE.

No. 888,411.    Specification of Letters Patent.    Patented May 19, 1908.

Application filed August 23, 1905. Serial No. 275,429.

*To all whom it may concern:*

Be it known that I, PETER SUHR, citizen of the United States, residing at Schleswig, in the county of Crawford and State of Iowa, have invented certain new and useful Improvements in Corn-Harvesting Machines; and I do hereby declare the following to be a full, clear, and exact description of the invention, such as will enable others skilled in the art to which it appertains to make and use the same.

My invention relates to corn harvesting or gathering machines and consists of certain novel features of combination and construction of parts as will be hereinafter clearly set forth and pointed out in the claims.

The main object of my invention is to provide a machine of the character specified which will be found reliably efficient in character and by means of which two rows of corn may be acted upon by the machine each time it is drawn through the field, thereby facilitating the work of gathering the corn from the stalk.

A further object of my invention is to provide means for stripping the ears from the standing corn stalks and husking the same or removing the covering including the silks and finally delivering the gathered corn in a clean, marketable condition.

Other objects and advantages will be hereinafter made clearly apparent, reference being had to the accompanying drawings which are made a part of this application and in which—

Figure 1 shows a top plan view of my invention complete ready for use. Fig. 2 is a side elevation of my machine. Fig. 3 is a central longitudinal section of my machine taken on line 3—3 of Fig. 1. Fig. 4 is a similar sectional view taken on line 4—4 of Fig. 1. Fig. 5 is a detail view showing a portion of the framework and part of the mechanism carried thereby, all of which is illustrated in plan view shown in Fig. 1. Fig. 6 is a detail view in side elevation of the controlling mechanism at the rear of the machine. Fig. 7 is a detail view of part of the driving mechanism illustrated in plan in Fig. 1.

The various details and coöperating accessories of my invention will, for convenience, be referred to by numerals, the same numeral applying to a similar part throughout the several views.

Referring to the numerals on the drawings 1 indicates the master carrying wheel, while 2 and 3 indicate auxiliary carrying wheels and upon said wheels 1 mount a suitable framework consisting of converging beams 6 supported from the shafts $2^a$ of the wheels 2 and 3 by upwardly extending inclined beams $6^a$ which are secured to the converging beams 6 and have standards 4 extending upward from them and from the beams 6, said standards having their upper ends fastened to side beams 5 which constitute the upper portions of the frame. I also provide the rearwardly-projecting beams or frame sections 7 to the rear ends of which I pivotally secure the forward ends of the truck frame 8, the latter being more clearly shown in Fig. 1 and said truck frame is provided with the adjusting wheel 9 operated and controlled in a manner hereinafter specified. Upon the framework thus or otherwise constructed I provide the forwardly projecting sections which I will designate by the numerals 10, 11 and 12, the nose sections 10 and 12 being upon the outside of the machine while the nose section 11 is in the central portion thereof, the object or office of said sections being to insure that the corn stalks will be guided into engagement with two pairs of stripping rollers designated by the numeral 13, the sections 10 and 12 being directed rearwardly and upwardly along the outer edge of the outside stripping rollers to form guard boards, and thus prevent the corn when snapped from the stalk from dropping to the outside of the stripping rollers, said rollers being rotatably mounted in suitable bearings 14 at their forward ends and inclined upwards and disposed in bearings in the cross-bar 15, which latter constitutes part of the framework. This bar 15 is secured at its ends to the upper reinforcing beams 6 and serves to rigidly connect the sides of the frame. Bar 15 also supports a deflector $15^a$ which extends downward under the stripping rolls and serves to direct corn dropped from said rolls to the forward raised ends of the cleaning rolls.

To prevent the corn from leaving the machine and dropping on to the ground as the corn leaves the deflector $15^a$ I have disposed a plurality of spring fingers $15^b$ across the front raised ends of the cleaning rolls, so that should the ears of corn rebound when striking the cleaning rolls, the fingers will catch the same and return it to the cleaning rolls.

The rear ends of the stripping rollers 13 or the journals thereof are extended as designated by the numeral 16 and each of said extended journals is provided with a beveled gear 17, designed to mesh with the driving gear 18 upon the driving shaft 19, which latter is also rotatably mounted in suitable bearings in the framework. The shaft 19 is provided near its central part with a sprocket wheel 20, which is placed in coöperation with the driving sprocket wheel 21 by means of the sprocket chain or belting 22, said sprocket wheel 21 being loosely mounted upon the shaft 23 and is provided upon its inner face with the clutch extension or sleeve 24 and it is therefore obvious that the driving sprocket 21 may be moved longitudinally upon said shaft by means of the controlling lever 25 coöperating with the rack-bar 26 whereby said lever may be adjusted and secured in position so that said sprocket wheel 21 will be held in or out of engagement with the clutch member 27 upon the hub of the carrying wheel 1, which wheel is adapted to rotate upon its shaft but cannot move longitudinally thereof.

I also mount upon the framework in suitable bearings the cleaning rollers 28 arranged in pairs and having at their forward ends suitable beveled gears 29 designed to mesh with the beveled gear 30 upon the shaft 31, said shaft being mounted in proper bearings 32 carried by the forward part of the framework of the machine. The shaft 31 is driven by a sprocket or band wheel 33 upon the shaft 23 placed in coöperation by suitable belting 33$^b$ with the band or sprocket wheel 33$^a$. Said band wheel 33 is provided upon its inner side with a clutch face 34 designed to coöperate with the clutch extension 35 upon the hub of the carrying wheel 1.

The driving band wheel or sprocket 33 being slidingly mounted on shaft 23 may be moved out of engagement with the clutch face 35 by means of the controlling lever 36, which latter is also provided with the rack-bar 37 whereby said lever may be locked in an adjusted position.

By reference to Fig. 1 it will be observed that the draft animals, preferably three in number, may be connected to the machine in any desired manner as by means of the swingle-trees 38, 39 and 40, the two outside swingle-trees 38 and 40 being connected to the outer ends of the levers 41 by means of suitable cables 42 passing over properly mounted pulleys 45, 45$^a$ and 46$^a$ carried by the framework of the machine. The middle draft animal attached to the swingle-tree 39 is connected to the inner ends of the levers 41 by means of the cable 44 passing over pulleys 45 and 46 located at proper points on the framework and as more clearly shown in Fig. 2.

It will be understood that a seat for the driver may be provided at any desired point and I deem it unnecessary to show the location of the seat in the accompanying drawings.

At the rear ends of the pairs of cleaning rollers 28 I provide the upwardly extending chutes or conveyers 47 each of said upwardly extending chutes having the endless conveyers 48 disposed around carrying wheels or cylinders 49 at each end of the conveyer chute, the upper cylinders 49 being actuated by shafts 49$^a$ mounted in proper bearings in the framework of the machine and extending through said cylinders or drums 49. Each shaft 49$^a$ has a pulley 49$^b$ which is driven by a belt 49$^c$ extending around a pulley 19$^a$ arranged on shaft 19. It is therefore obvious that both of the endless carriers or elevators 48 will be driven in the proper direction to carry the corn delivered into the conveyer chutes 47 by the cleaning rollers 28.

It now becomes desirable to provide means for receiving the corn from the upper ends of the conveyer chutes 47 and deliver the same laterally to one side of the machine into any suitable receptacle placed upon the framework to receive the corn or deliver it directly into a wagon which may be driven alongside of the machine incident to the operation thereof and with this purpose in view I provide the transversely located chute 54 in which I mount the carrier apron or endless belting 55 disposed over carrying drums or rollers 56 at each end of the chute and only one of which is shown, the inner carrying roller or drum 56 being provided with an extended shaft 56$^a$ upon which I secure the beveled gear 57 placed in mesh with the gear 58 upon the shaft 50 which extends longitudinally along the front side of the chute 54 and has a sprocket 51 thereon which is driven by a chain 53 extending around a sprocket 52 on the shaft 19. It is therefore obvious that the rotation of shaft 19 caused by the forward movement of the machine will not only rotate the stripping rolls 13 through the gears 17 and 18 but will also cause motion to be transmitted through the belts 49$^c$ to the conveyers 48 and through the chain 53 to the laterally extending conveyer 55. If deemed desirable the middle horse may have upon each side a guiding shaft 59 and 60, said shafts being extended forward on each side of the animal and will serve as a guide to more reliably direct the standing stalks of corn in position to be engaged by the pairs of stripping rollers 13 and in view of the limited space I have shown the forward ends of said shafts as being broken away though it will be readily understood that they may be extended outward for the purpose above set forth.

It becomes desirable to secure proper adjustment of the forward end of the machine relative to the height of the ears of corn to be gathered and with this purpose in view I provide the auxiliary carrying wheel 9 at the rear of the machine and the framework 8 of said carrying wheel is connected to the controlling cable 61 which extends forward under the pulley 62 and is thence passed upward into engagement with the arm 63 forming an angular extension on the lower end of the controlling lever 64, which latter is mounted in the brackets 65 carried by part of the framework. The controlling lever 64 is provided with the usual thumb lever or auxiliary controlling mechanism 66 placed in coöperative relation with the detent 67 as by the link member 68 and it is obvious that by moving the lever 64 forwardly the detent 67 may be drawn out of the rack-bar 67ª and the cable 61 will be drawn upon, thereby drawing the extreme outer end of the framework 8 downward incidentally elevating the rear end of the machine and lowering the forward end thereof and that a reverse movement of said lever will secure directly opposite adjustment of said parts of the machine. By this simple appliance I am therefore enabled to place the adjustment of the machine under complete control of the operator as will be readily apparent by reference to the drawings.

The various parts of my invention may be made of any desired material and any suitable size to produce a machine of the character specified by means of which two rows of corn may be acted upon at the same time and the ears gathered from the stalks and husked and delivered in a thoroughly clean condition as hereinbefore explained and while I have described the preferred construction and combination of parts it is thought the operation thereof will be clearly apparent though it may be stated that the machine is driven through the field so that the middle animal will walk between the two rows of corn to be gathered which will dispose the two outside horses immediately outside of said two rows of corn and said rows will therefore be in position to be received between the pairs of stripping rollers 13 and as said rollers are provided with upwardly directed screw threads the ears of corn will be stripped therefrom and forced out of the husk covering the same when they will drop downward between the guiding plates 69 disposed on each side of the pairs of cleaning rollers 28 thereby conveying the ears of corn into engagement with said cleaning rollers and any remaining husks thereon will be entirely removed and the corn will gradually move downward by gravity to the rear ends of said roller inasmuch as said rollers are inclined in position as will be observed by reference to Fig. 2 and other views. The corn passing off the rollers 28 will be directed into the chutes or conveyers 47 and delivered at the upper ends thereof by the endless carriers 48 on to the endless carrier 55 and thence conveyed to a receptacle or into an adjacent vehicle.

Having thus fully described my invention, what I claim as new and desire to secure by Letters Patent, is—

1. In a corn harvester, the combination with a frame, a plurality of pairs of stripping rollers operatively mounted within said frame, and guides coöperating with said stripping rollers to direct the stalks of corn therebetween; of nose sections directed rearwardly and upwardly along the outer edges of the outside stripping rollers, cleaning rollers, a forwardly and downwardly inclined deflector under each pair of stripping rollers, whereby the corn will be directed into engagement with the husking rolls, means disposed across the path of the descending corn to throw the same into engagement with the husking rolls, and additional means to operate said stripping rollers.

2. In a corn harvester of the class described, the combination with a suitable frame, stripping rollers mounted thereon and disposed in pairs, husking rolls and guide sections for each pair of rollers whereby the stalks of corn will be guided between said rollers; of a downwardly and forwardly inclined deflector under each pair of rollers adapted to receive the corn and guide the same into engagement with the husking rolls, a plurality of spring fingers disposed across the path of the descending corn, and means to operate said stripping rollers.

3. A corn harvester comprising a frame, a plurality of stripping rollers disposed in pairs, a cross-bar at the upper end of said rollers, deflectors secured to said cross-bar and disposed one under each pair of stripping rollers, husking rolls beneath said deflector, and independently movable spring fingers disposed across the forward end of said husking rolls, whereby the corn descending from the deflectors will be thrown into engagement with the husking rolls, and means to operate said stripping rollers and husking rolls.

4. In a corn harvester, the combination of a frame, a plurality of pairs of stripping rollers, one pair upon each side of the machine, said rollers being spirally corrugated, nose sections directed upwardly and rearwardly along the outer edge of the outside stripping rollers, husking rollers in pairs, upwardly and rearwardly extending conveyers at the rear ends of the husking rollers, a downwardly and forwardly-inclined deflector under each pair of stripping rollers, means for operating the stripping rollers, and a plurality of independently-movable spring fingers extended transversely across the forward raised ends of the said husking rollers.

5. In a corn harvester, the combination with the stripping rollers, of a bar secured to the upper portion of the frame, a deflector supported by said bar and extended downwardly parallel with and beneath said stripping rollers, and a plurality of spring fingers disposed in advance of said deflector to cause the corn to rebound.

6. In a corn harvester, the combination with the stripping rollers, of a bar secured to the upper portion of the frame, a deflector supported by said bar and extended downwardly parallel with and beneath said stripping rollers, a plurality of spring fingers disposed in advance of said deflector to cause the corn to rebound, and husking rollers disposed beneath said spring fingers.

7. In a corn harvester, the combination with the stripping rollers, of a bar secured to the upper portion of the frame, a deflector supported by said bar and extended downwardly parallel with and beneath said stripping rollers, a plurality of spring fingers disposed in advance of said deflector to cause the corn to rebound, and husking rollers disposed beneath said spring fingers, said husking rollers having their front ends raised with the spring fingers extended across the same.

In testimony whereof I have signed my name to this specification in the presence of two subscribing witnesses.

PETER SUHR.

Witnesses:
  B. S. ANDRESEN,
  JOHN KRUGER.